(12) United States Patent
Gu et al.

(10) Patent No.: US 10,303,034 B2
(45) Date of Patent: May 28, 2019

(54) DOUBLE-SIDED DISPLAY PANEL AND DOUBLE-SIDED DISPLAY DEVICE

(71) Applicant: BOE TECHNOLOGY GROUP CO., LTD., Beijing (CN)

(72) Inventors: Xin Gu, Beijing (CN); Jikai Yao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 105 days.

(21) Appl. No.: 15/511,109

(22) PCT Filed: May 18, 2016

(86) PCT No.: PCT/CN2016/082492
§ 371 (c)(1),
(2) Date: Mar. 14, 2017

(87) PCT Pub. No.: WO2017/133133
PCT Pub. Date: Aug. 10, 2017

(65) Prior Publication Data
US 2018/0149941 A1    May 31, 2018

(30) Foreign Application Priority Data
Feb. 2, 2016    (CN) .......................... 2016 1 0073421

(51) Int. Cl.
*G02F 1/157*    (2006.01)
*G02F 1/15*    (2019.01)
*G02F 1/155*    (2006.01)
*H01B 1/08*    (2006.01)
(Continued)

(52) U.S. Cl.
CPC ............ *G02F 1/157* (2013.01); *G02F 1/1503* (2019.01); *G02F 1/153* (2013.01); *G02F 1/155* (2013.01);
(Continued)

(58) Field of Classification Search
CPC . G02F 1/15; G02F 1/157; G02F 1/155; G02F 1/1521; G02F 1/1523;
(Continued)

(56) References Cited

U.S. PATENT DOCUMENTS 5,847,860 A    12/1998  Hougham et al.
2009/0237775 A1*  9/2009  Ito .......................... G02F 1/1339
                                                 359/296
(Continued)

FOREIGN PATENT DOCUMENTS

CN    102301274 A    12/2011
CN    102346343 A    2/2012
(Continued)

OTHER PUBLICATIONS

English translation of CN 103186006, machine translated on Jul. 2, 2018.*
(Continued)

*Primary Examiner* — Jie Lei
(74) *Attorney, Agent, or Firm* — Ladas & Parry LLP

(57) ABSTRACT

A double-sided display panel and a double-sided display device are provided. The double-sided display panel includes a first substrate, a second substrate, a pair of electrodes, and a color display unit, an isolating reflection layer and a black-and-white display unit which are sequentially provided between the first substrate and the second substrate, wherein the color display unit includes an electrochromic material; the black-and-white display unit includes an electrolytic solution, and black particles and white particles having opposite charges dispersed in the electrolytic solution; the isolating reflection layer has properties of allowing ions in the electrolytic solution to permeation and reflecting light. The double-sided display panel has a simple structure and is easy for production, and displays on
(Continued)

both sides do not affect each other and bistable display can be achieved.

20 Claims, 2 Drawing Sheets

(51) Int. Cl.
    *G02F 1/1503*     (2019.01)
    *G02F 1/153*     (2006.01)
    *G02F 1/167*     (2019.01)
    *G02F 1/1516*     (2019.01)

(52) U.S. Cl.
    CPC ............... *G02F 1/167* (2013.01); *H01B 1/08* (2013.01); *G02F 1/15165* (2019.01); *G02F 2201/44* (2013.01); *G02F 2203/34* (2013.01)

(58) Field of Classification Search
    CPC ........ G02F 1/1525; G02F 1/167; G02F 1/163; G02F 2001/1515; G02F 2203/34; G02F 1/1503; G02F 1/153; G02F 1/15165; G02F 2201/44; G02B 26/0841; G02B 26/0833; H01B 1/08
    USPC ....... 359/272, 265, 269, 271, 270, 275, 290, 359/291, 292, 295, 298, 296; 345/24, 84, 345/105, 107
See application file for complete search history.

(56) References Cited

U.S. PATENT DOCUMENTS

| | | |
|---|---|---|
| 2012/0008075 A1 | 1/2012 | Kwon et al. |
| 2012/0033286 A1 | 2/2012 | Yashiro et al. |

FOREIGN PATENT DOCUMENTS

| | | |
|---|---|---|
| CN | 103186006 A | 7/2013 |
| CN | 104298043 A | 1/2015 |
| CN | 105511195 A | 4/2016 |
| KR | 1020070024752 A | 3/2007 |
| KR | 1020090054753 A | 6/2009 |

OTHER PUBLICATIONS

International Search Report and Written Opinion dated Aug. 29, 2016; PCT/CN2016/082492.

The First Chinese Office Action dated Apr. 2, 2018; Appln. No. 201610073421.6.

* cited by examiner

DOUBLE-SIDED DISPLAY PANEL AND DOUBLE-SIDED DISPLAY DEVICE

TECHNICAL FIELD

Embodiments of the present disclosure relate to a double-sided display panel and a double-sided display device comprising the double-sided display panel.

BACKGROUND

A double-sided display device is a device capable of displaying images on both sides of a panel simultaneously, and the double-sided display device has a wide range of application, such as a communication industry, a window industry, a financial industry, and a transportation industry, for example, it can be used in the public places with a large visitor flow such as business halls, airports, railway stations, subway stations, or canteens of the window industry, and double-sided displays have a broad prospect for development.

Generally, a double-sided display device is formed by sticking two single-sided display panels, for example, a single-sided liquid crystal (LC) panel and/or an OLED (Organic Light-Emitting Diode) display panel, or by sticking two single-sided display panels that have been obtained separately. The double-sided display device formed in this manner can realize double-sided display, but each display unit is an independent member, and the double-sided display device has the problems such as a large volume, a large thickness, a great weight, etc. Moreover, the display effect of the double-sided display device is determined by each display unit, and thus it is difficult to achieve the complementary effect.

SUMMARY

At least one embodiment of the present disclosure provides a double-sided display panel and a double-sided display device including the double-sided display panel. The double-sided display panel has a simple structure and is easy for production, and displays on both sides do not affect each other and bistable display can be achieved.

At least one embodiment of the present disclosure provides a double-sided display panel which includes a first substrate, a second substrate, a pair of electrodes and a color display unit, an isolating reflection layer and a black-and-white display unit, which are sequentially provided between the first substrate and the second substrate, wherein the color display unit includes an electrochromic material; the black-and-white display unit includes an electrolytic solution, and black particles and white particles having opposite charges dispersed in the electrolytic solution; the isolating reflection layer has properties of allowing ions in the electrolytic solution to permeation and reflecting light; in operation of the double-sided display panel, ions in the electrolytic solution can permeate through the isolating reflection layer under an action of the pair of electrodes, so that the electrochromic material in the color display unit displays a color pattern by obtaining or losing electrons, and the black particles and the white particles in the black-and-white display unit display a black-and-white pattern with being in different layers according to color.

For example, in the double-sided display panel provided in one embodiment of the present disclosure, the double-sided display panel is divided into a plurality of pixel regions, the electrochromic material is provided in the pixel regions, and the electrochromic material provided in the adjacent pixel regions display different colors.

For example, in the double-sided display panel provided in one embodiment of the present disclosure, three adjacent pixel regions are provided with a red electrochromic material, a green electrochromic material, and a blue electrochromic material respectively, and the red electrochromic material, the green electrochromic material and the blue electrochromic material exhibit a transition between a transparency and a corresponding color when the pair of electrodes in an energized state and a non-energized state respectively, thereby a color display is achieved.

For example, in the double-sided display panel provided in one embodiment of the present disclosure, the black-and-white display unit is provided with a barrier wall in an interval region corresponding to adjacent pixel regions, and the electrolytic solution, the black particles and the white particles are provided in a chamber formed by adjacent barrier walls.

For example, in the double-sided display panel provided in one embodiment of the present disclosure, the black particles and the white particles move in opposite directions to be far away from or close to the isolating reflection layer when the pair of electrodes in an energized state, thereby a black-and-white display is achieved.

For example, in the double-sided display panel provided in one embodiment of the present disclosure, the isolating reflection layer is formed of titanium oxide, and the electrolytic solution contains Li ions, the Li ions are capable of permeating the isolating reflection layer and the isolating reflection layer is capable of transporting the Li ions.

For example, in the double-sided display panel provided in one embodiment of the present disclosure, the isolating reflection layer is formed of silicon dioxide, and the electrolytic solution contains Li ions, the Li ions are capable of permeating the isolating reflection layer and the isolating reflection layer is capable of transporting the Li ions.

For example, in the double-sided display panel provided in one embodiment of the present disclosure, the first substrate and the second substrate are disposed opposite to each other, the pair of electrodes includes a common electrode and a pixel electrode, the common electrode is disposed on one side of the first substrate or the second substrate, and the pixel electrode is disposed in each of the pixel region on one side of the second substrate or the first substrate.

For example, in the double-sided display panel provided in one embodiment of the present disclosure, each of the pixel region is further provided with a thin film transistor, and the pixel electrode is connected to the thin film transistor located in the same pixel region as the pixel electrode.

For example, in the double-sided display panel provided in one embodiment of the present disclosure, the common electrode is in a shape of plate, the pixel electrode is in a shape having slit, and both the common electrode and the pixel electrode are made of a transparent conductive material.

For example, in the double-sided display panel provided in one embodiment of the present disclosure, the transparent conductive material includes one or more of indium zinc oxide, indium tin oxide, or indium gallium tin oxide.

For example, in the double-sided display panel provided in one embodiment of the present disclosure, the electrochromic material includes an inorganic electrochromic material or an organic electrochromic material.

For example, in the double-sided display panel provided in one embodiment of the present disclosure, the inorganic electrochromic material includes iridium oxide, cadmium oxide, rhodium oxide, vanadium oxide, tungsten oxide, or molybdenum oxide, and the organic electrochromic material includes methyl viologen or polythiophenes.

For example, in the double-sided display panel provided in one embodiment of the present disclosure, in the electrochromic materials, iridium oxide, cadmium oxide, rhodium oxide, vanadium oxide, and methyl viologen can be used as anode electrochromic material, and tungsten oxide, molybdenum oxide, and polythiophenes can be used as cathode electrochromic material.

At least one embodiment of the present disclosure further provides a double-sided display device which includes a display panel and a drive circuit connected to the display panel, and the display panel is any one of the above-mentioned double-sided display panel.

For example, in the double-sided display device provided in one embodiment of the present disclosure, the color display unit and the black-and-white display unit are connected to the same drive circuit.

For example, in the double-sided display device provided in one embodiment of the present disclosure, the color display unit and the black-and-white display unit display a same image at a moment, or the color display unit and the black-and-white display unit display complementary images at a moment.

BRIEF DESCRIPTION OF THE DRAWINGS

In order to clearly illustrate the technical solution of the embodiments of the disclosure, the drawings of the embodiments will be briefly described in the following, it is obvious that the described drawings are only related to some embodiments of the disclosure and thus are not limitative of the disclosure.

REFERENCE NUMERALS

1—first substrate; 2—second substrate; 3—color display unit; 31—electrochromic layer, 4—black-and-white display unit; 41—barrier wall; 42—black particles; 43—white particles; 5—isolating reflection layer; 6—common electrode; 7—pixel electrode.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

First Embodiment

The present embodiment provides a double-sided display panel which has a simple structure and is easy for production, and displays on both sides do not affect each other and bistable display can be achieved.

Figure 1:
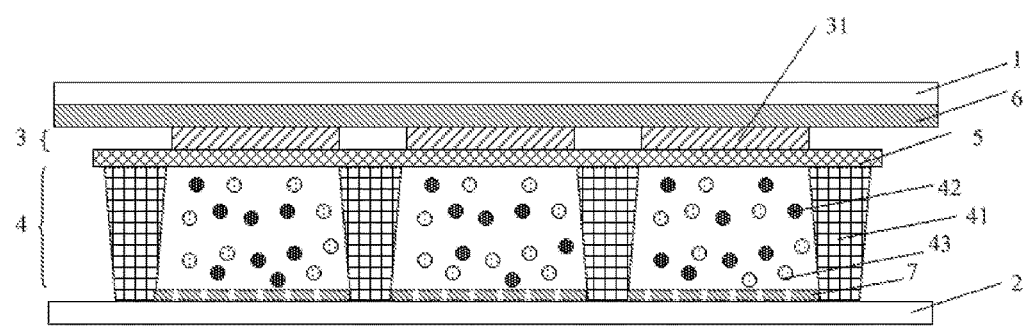
FIG. 1 is a schematic diagram of the structure of the double-sided display panel in a first embodiment of the present disclosure.

As shown in FIG. 1, a double-sided display panel includes a first substrate 1, a second substrate 2 and a pair of electrodes, and further includes a color display unit 3, an isolating reflection layer 5, and a black-and-white display unit 4, which are sequentially provided between the first substrate 1 and the second substrate 2. The color display unit 3 includes an electrochromic (EC) material. The black-and-white display unit 4 includes an electrolytic solution and includes black particles 42 and white particles 43 having opposite charges dispersed in the electrolytic solution. The isolating reflection layer 5 has properties of allowing ions in the electrolytic solution to permeation and reflecting light. The color display unit 3 and the black-and-white display unit 4 are disposed facing away from the isolating reflection layer 5. The ions in the electrolytic solution can permeate through the isolating reflection layer 5 under the action of the pair of electrodes, so that the electrochromic material in the color display unit 3 displays a color pattern by obtaining or losing electrons, and the black particles 42 and the white particles 43 in the black-and-white display unit 4 display a black-and-white pattern when the particles are in different layers (layered) according to color. The pattern displayed by the color display unit 3 and the pattern displayed by the black-and-white display unit 4 are displayed in opposite directions with respect to the isolating reflection layer 5.

The double-sided display panel is divided into a plurality of pixel regions, the color display unit 3 is provided with electrochromic materials capable of displaying different colors in adjacent pixel regions respectively to form an electrochromic layer 31; the black-and-white display unit 4 is provided with a barrier wall 41 within an interval region corresponding to the adjacent pixel regions, and the electrolytic solution, the black particles 42 and the white particles 43 are provided in a chamber formed by adjacent barrier walls 41. In the color display unit 3, a separation wall needs to be provided between the electrochromic materials made of a solution, and the separation wall can be made of, but not limited to, for example, a black matrix material; as for the electrochromic material formed by means of vapor deposition or vacuum sputtering, a separation wall may not be provided. The black matrix can be made of, for example, a black resin material, a black photoresist material or the like, for example, carbon black can be added to allow the resultant corresponding material to present black.

Herein, electrochromism refers to a phenomenon that the optical properties (reflectivity, transmissivity, absorption rate, etc.) of a material undergo a stable and reversible color change under the action of an applied electric field, which exhibits a reversible conversion of color and transparency in appearance. Electrochromic material has a good ionic conductivity and a good electronic conductivity, and can have a high contrast, a high discoloration efficiency, a lager cycle time, a high write-erase efficiency and other electrochromic properties. The black particles 42 and the white particles 43 do not emit light, but they are capable of reflecting light. The materials of the black particles and the white particles may be, for example, black particles and white particles used in an electronic ink display device, and detailed descriptions will be omitted here.

For example, three adjacent pixel regions are provided with a red electrochromic material, a green electrochromic material and a blue electrochromic material respectively. The red electrochromic material, the green electrochromic material and the blue electrochromic material exhibit a transition between a transparency and a corresponding color when the pair of electrodes in an energized state and a non-energized state respectively, thereby a color display is achieved. The black particles 42 and the white particles 43 move in opposite directions to be far away from or close to the isolating reflection layer 5 when the pair of electrodes in an energized state, thereby a black-and-white display is achieved.

For example, the isolating reflection layer 5 is formed of titanium dioxide ($TiO_2$), and the cations contained in the electrolytic solution of the black-and-white display unit 4 include Li ions and the anions contained include perchlorate ions; the Li ions are capable of permeating the isolating reflection layer and the isolating reflection layer is capable of transporting the Li ions to the electrochromic layer 31 in the color display unit 3 to ensure that the electrochromic layer 31 can achieve a direct conversion of transparency and color. Because the titanium dioxide material has a good reflection effect, it can reflect the light transmitted to it and can ensure that display actions on both sides do not affect each other, thereby a better display effect is achieved.

Alternatively, for example, the isolating reflection layer 5 is formed of silicon dioxide ($SiO_2$), and the cations contained in the electrolytic solution of the black-and-white display unit 4 include Li ions and the anions contained include perchlorate ions. The $SiO_2$ material also has a good reflection effect and can reflect the light transmitted to it and can ensure that display actions on both sides do not affect each other.

In FIG. 1, the first substrate 1 and the second substrate 2 are disposed opposite to each other and are both transparent, and the pair of electrodes includes a common electrode 6 provided on the side of the first substrate 1 or the second substrate 2, and a pixel electrode 7 disposed in each of the pixel regions on the side of the second substrate 2 or the first substrate 1; each of the pixel region can be further provided with a thin film transistor to obtain an active drive circuit, the pixel electrode 7 is connected to the drain of the thin film transistor located in the same pixel region as the pixel electrode 7. For example, the common electrode 6 is in a shape of plate and corresponds to a plurality of pixel regions collectively, and the pixel electrode 7 is in a shape having slit and corresponds to one pixel region. Furthermore, the common electrode 6 and the pixel electrode 7 are formed of a transparent conductive material, for example, at least one of indium zinc oxide (IZO), indium tin oxide (ITO), and indium gallium tin oxide (IGTO).

In order to achieve the effect of color display, the adjacent pixel regions for realizing full-color display generally include an electrochromic material of red-green-blue (RGB) cyclically arranged, which form color electrochromic layers 31 respectively. The gray scale of red, green and blue can be adjusted by applying different voltages, and further color can be formed by combining the three primary colors. For example, the red electrochromic layer includes a copolymer of [3,4-bis(2-ethylhexyloxy)thiophene]-thiophene-[3,4-dimethoxythiophene], which can be converted among transparency (for example, 0 V), red (for example, 3 V) and different degrees of red (any voltage from 0V to 3 V); for example, the green electrochromic layer includes a copolymer of [3,4-propylenedioxythiophene]-[3,4-propylenediazabenzene], which can be converted among transparency (for example, 0 V), green (for example, 3 V) and different degrees of green (any voltage from 0V to 3 V); for example, the blue electrochromic layer includes a copolymer of 3,4-(2,2-bis(2-oxo-3-phenylpropyl))propylenedioxythiophene, which can be converted among transparency (for example, 0 V), blue (for example, 2 V) and different degrees of blue (any voltage from 0V to 2 V).

In the double-sided display panel according to the present embodiment, the electrochromic material may include an inorganic electrochromic material or an organic electrochromic material, the inorganic electrochromic material includes iridium oxide, cadmium oxide, rhodium oxide, vanadium oxide, tungsten oxide, or molybdenum oxide, and the organic electrochromic material includes methyl viologen or polythiophenes. In the electrochromic materials, iridium oxide, cadmium oxide, rhodium oxide, vanadium oxide, and methyl viologen can be used as an anode electrochromic material, and tungsten oxide, molybdenum oxide, and polythiophenes can be used as a cathode electrochromic material. As for the anode electrochromic materials, they undergo an oxidation reaction in an energized state so as to display color; as for the cathode electrochromic materials, they undergo a reduction reaction in an energized state so as to display color.

Figure 2:
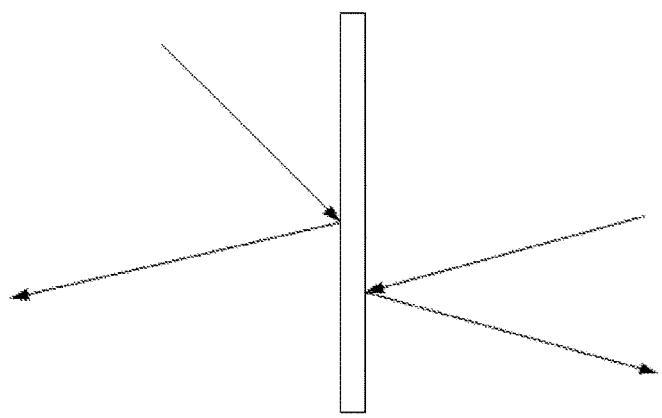
FIG. 2 is a schematic diagram of the light for the double-sided display panel in FIG. 1 to achieve double-sided display.
Figure 3:
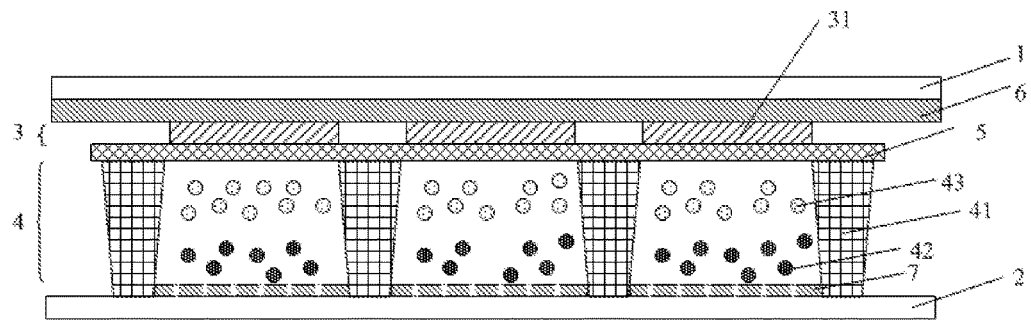
FIG. 3 is a schematic diagram of ions movement for the double-sided display panel in FIG. 1 to achieve double-sided display.

The display principle of the double-sided display panel according to the present embodiment is described as follows:

As shown in FIG. 2, light enters into the color display unit 3 and the black-and-white display unit 4 from both sides of the double-sided display panel respectively; as shown in FIG. 3, when the electrochromic material on the color display side is an anode electrochromic material, the anions in the electrolytic solution pass through the isolating reflection layer 5 and move towards the electrochromic layer 31 under the action of an electric field when the electrochromic layer 31 is energized, and the electrochromic material loses electrons and undergoes an oxidation reaction, thereby displaying color and realizing a color pattern display by reflecting light to the side of the electrochromic layer 31 through the isolating reflection layer 5; when the electrochromic material on the color display side is a cathode electrochromic material, the cations in the electrolytic solution pass through the isolating reflection layer 5 and move towards the electrochromic layer 31 under the action of an electric field when the electrochromic layer 31 is energized, and the electrochromic material obtains electrons and undergoes an reduction reaction, thereby displaying color and realizing a color pattern display by reflecting light to the side of the electrochromic layer 31 through the isolating reflection layer 5. In the above process, the charged white particles 43 and black particles 42 on the black-and-white display side also float up and down under the action of the electric field and are in different layers so as to reflect white or black, thereby realizing a black-and-white pattern display.

It should be understood that, in practice, the color of the charged particles at the outer side is a color which is displayed by reflection and is visible for human, and the white or black reflection in the black-and-white display unit 4 can be selected as desired without limitation here.

Currently, there are display device manufacturers dedicated to the research and development of electrochromic display. However, in the electrochromic display panel, the electrolytic solution is generally disposed between the electrochromic layer and the reflection layer. In some cases, it is difficult to realize pure black or pure white. In the process of realizing black: all the three colors of light are absorbed by three kinds of electrochromic materials of RGB, but the absorption of light is typically incomplete, thus the black is not dark enough. In the process of realizing white: all the three electrochromic materials of RGB are adjusted to be a transparent state and light is completely transmitted to realize white, in which a transparent state rather than white is actually displayed.

In the double-sided display panel according to the present embodiment, the color display side may be simply provided with an electrochromic layer, on the black-and-white display side opposite to the color display, the electrolytic solution may further includes, in addition to conventional anions and cations, black particles 42 and white particles 43 having opposite charges. Thus, pure black display or pure white display can be achieved by adjusting the black particles 42 or the white particles 43 to be relatively closer to the color display side. Although the isolating reflection layer 5 has a reflection effect, its reflectivity is not as great as the reflectivity (about 60% to 70%) of a metallic mirror reflection, as a result, the remaining light will be transmitted to the opposite side so as to be reflected to the black particles 42 or the white particles 43 adjacent to the isolating reflection layer side to achieve a pure black display or a pure white display.

In the double-sided display panel according to the present embodiment, both the color display unit and the black-and-white display unit share the pair of electrodes and simultaneously achieve the color display and the black-and-white display on both display sides by the movement of the same ions in the electrolytic solution, thus producing a purer black effect and a better display effect than a conventional electrochromic display panel. Moreover, it is unnecessary to supply power to change the electric field when the display image does not need to be switched, and therefore bistable display can be achieved on both sides, and energy can be saved.

Second Embodiment

The present embodiment provides a double-sided display device including a display panel and a drive circuit connected to the display panel, the display panel is the double-sided display panel according to the first embodiment.

As for the double-sided display panel according to the first embodiment, under the action of the pair of electrodes, the isolating reflection layer enables the anions and cations in the electrolytic solution to be permeated and causes a color change on the color display side, and also enables the black particles and white particles on the black-and-white display side to change the aggregation position so as to form a black-and-white pattern. The color display unit 3 and the black-and-white display unit 4 are connected to the same drive circuit, the color display unit 3 and the black-and-white display unit 4 display a same image at a moment, or the color display unit 3 and the black-and-white display unit 4 display complementary images at a moment.

Figure 4:
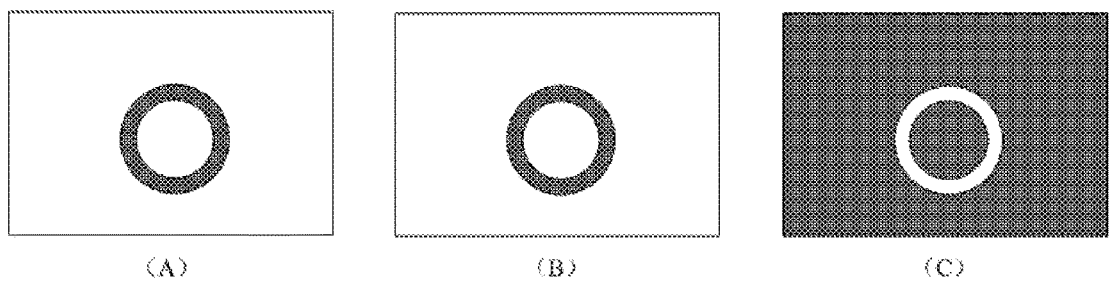
FIG. 4 is a schematic diagram of a double-sided display effect of a double-sided display panel in a second embodiment of the present disclosure.

As shown in FIG. 4, when the color display unit 3 displays the circle ring pattern in (A), the black-and-white display unit 4 is enabled to display image of (B) which is the same as image (A) or to display image (C) which is complementary to image (A) by adjusting the black particles 42 and the white particles 43 which is relatively closer to the outer side of display side. For example, as for the double-sided display panel that displays complementary images, an anode electrochromic material is selected as the electrochromic material, and the image can be realized when the black particles 42 are positively charged; as for the double-sided display panel that displays the same image, a cathode electrochromic material is selected as the electrochromic material, and the image can be realized when the black particles 42 are positively charged.

The double-sided display panel and the double-sided display device according to the embodiments of the present invention have at least one of the following advantages:

(1) in the double-sided display panel, the color display unit and the black-and-white display unit share a pair of electrodes to achieve a color display and a black-and-white display on both display sides simultaneously;

(2) the electrochromic display panel has a quite pure black effect and achieves a good display effect;

(3) it is unnecessary to supply power to change the electric field when the display image does not need to be switched, and therefore bistable display can be achieved on both sides, and energy can be saved;

(4) the same information or complementary information may be easy for display on both sides by using the double-sided display device; or (5) the double-sided display panel has a simple structure and is easy for production, and displays on both sides do not affect each other.

What are described above is related to the illustrative embodiments of the disclosure only and not limitative to the scope of the disclosure; the scopes of the disclosure are defined by the accompanying claims.

The present application claims the priority of the Chinese Patent Application No. 201610073421.6 filed on Feb. 2, 2016, which is incorporated herein by reference as part of the disclosure of the present application.

What is claimed is:

1. A double-sided display panel comprising:
a first substrate,
a second substrate,
a pair of electrodes, one electrode of which is provided on the first substrate and the other one of which is provided on the second substrate, and
a color display unit, an isolating reflection layer and a black-and-white display unit, which are sequentially provided between the first substrate and the second substrate, wherein
the color display unit comprises an electrochromic material;
the black-and-white display unit comprises an electrolytic solution, and black particles and white particles having opposite charges dispersed in the electrolytic solution;
the isolating reflection layer has properties of allowing ions in the electrolytic solution to permeation and reflecting light;
in operation of the double-sided display panel, ions in the electrolytic solution can permeate through the isolating reflection layer under an action of the pair of electrodes, so that the electrochromic material in the color display unit displays a color pattern by obtaining or losing electrons, and the black particles and the white particles in the black-and-white display unit display a black-and-white pattern with being in different layers according to color.

2. The double-sided display panel according to claim 1, wherein the double-sided display panel is divided into a plurality of pixel regions, the electrochromic material is provided in the pixel regions, and the electrochromic material provided in the adjacent pixel regions display different colors.

3. The double-sided display panel according to claim 2, wherein three adjacent pixel regions are provided with a red electrochromic material, a green electrochromic material, and a blue electrochromic material respectively, and the red electrochromic material, the green electrochromic material and the blue electrochromic material exhibit a transition between a transparency and a corresponding color when the pair of electrodes in an energized state and a non-energized state respectively, thereby a color display is achieved.

4. The double-sided display panel according to claim 2, wherein the black-and-white display unit is provided with a barrier wall in an interval region corresponding to adjacent pixel regions, and the electrolytic solution, the black particles and the white particles are provided in a chamber formed by adjacent barrier walls.

5. The double-sided display panel according to claim 2, wherein the black particles and the white particles move in opposite directions to be far away from or close to the isolating reflection layer when the pair of electrodes in an energized state, thereby a black-and-white display is achieved.

6. The double-sided display panel according to claim 2, wherein the electrochromic material comprises an inorganic electrochromic material or an organic electrochromic material.

7. The double-sided display panel according to claim 1, wherein the black-and-white display unit is provided with a barrier wall in an interval region corresponding to adjacent pixel regions, and the electrolytic solution, the black particles and the white particles are provided in a chamber formed by adjacent barrier walls.

8. The double-sided display panel according to claim 1, wherein the black particles and the white particles move in opposite directions to be far away from or close to the isolating reflection layer when the pair of electrodes in an energized state, thereby a black-and-white display is achieved.

9. The double-sided display panel according to claim 1, wherein the isolating reflection layer is formed of titanium oxide, and the electrolytic solution contains Li ions, the Li ions are capable of permeating the isolating reflection layer and the isolating reflection layer is capable of transporting the Li ions.

10. The double-sided display panel according to claim 1, wherein the isolating reflection layer is formed of silicon dioxide, and the electrolytic solution contains Li ions, the Li ions are capable of permeating the isolating reflection layer and the isolating reflection layer is capable of transporting the Li ions.

11. The double-sided display panel according to claim 1, wherein the first substrate and the second substrate are disposed opposite to each other, the pair of electrodes comprises a common electrode and a pixel electrode, the common electrode is disposed on a side of the first substrate or the second substrate, and the pixel electrode is disposed in each of the pixel region on a side of the second substrate or the first substrate.

12. The double-sided display panel according to claim 11, wherein each of the pixel region is further provided with a thin film transistor, and the pixel electrode is connected to the thin film transistor located in a same pixel region as the pixel electrode.

13. The double-sided display panel according to claim 11, wherein the common electrode is in a shape of plate, the pixel electrode is in a shape having slit, and both the common electrode and the pixel electrode are made of a transparent conductive material.

14. The double-sided display panel according to claim 13, wherein the transparent conductive material comprises one or more of indium zinc oxide, indium tin oxide, or indium gallium tin oxide.

15. The double-sided display panel according to claim 1, wherein the electrochromic material comprises an inorganic electrochromic material or an organic electrochromic material.

16. The double-sided display panel according to claim 15, wherein the inorganic electrochromic material comprises iridium oxide, cadmium oxide, rhodium oxide, vanadium oxide, tungsten oxide, or molybdenum oxide, and the organic electrochromic material comprises methyl viologen or polythiophenes.

17. The double-sided display panel according to claim 16, wherein in the electrochromic materials, iridium oxide, cadmium oxide, rhodium oxide, vanadium oxide, and methyl viologen can be used as anode electrochromic material, and tungsten oxide, molybdenum oxide, and polythiophenes can be used as cathode electrochromic material.

18. A double-sided display device, comprising a display panel and a drive circuit connected to the display panel, wherein the display panel is the double-sided display panel according to claim 1.

19. The double-sided display device according to claim 18, wherein the color display unit and the black-and-white display unit are connected to the same drive circuit.

20. The double-sided display device according to claim 19, wherein the color display unit and the black-and-white display unit display a same image at a moment, or the color display unit and the black-and-white display unit display complementary images at a moment.

* * * * *